(No Model.) 2 Sheets—Sheet 1.

T. B. JONES.
BAGGING APPARATUS.

No. 406,218. Patented July 2, 1889.

WITNESSES:
F. McArdle.
C. Sedgwick.

INVENTOR:
T. B. Jones
BY Munn & Co.
ATTORNEYS.

(No Model.) 2 Sheets—Sheet 2.

T. B. JONES.
BAGGING APPARATUS.

No. 406,218. Patented July 2, 1889.

WITNESSES:
F. McArdle.
C. Sedgwick

INVENTOR:
T. B. Jones
BY Munn & Co.
ATTORNEYS.

UNITED STATES PATENT OFFICE.

THOMAS B. JONES, OF RADNOR, OHIO.

BAGGING APPARATUS.

SPECIFICATION forming part of Letters Patent No. 406,218, dated July 2, 1889.

Application filed August 14, 1888. Serial No. 282,734. (No model.)

*To all whom it may concern:*

Be it known that I, THOMAS B. JONES, of Radnor, in the county of Delaware and State of Ohio, have invented a new and Improved Combined Truck and Bag Holder, of which the following is a full, clear, and exact description.

My invention relates to an improvement in combined truck and bag holder, and has for its object to provide a device specially adapted for use in a field and purposed to afford a convenient means for sacking corn, potatoes, and other similar articles.

The invention consists in the construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1:
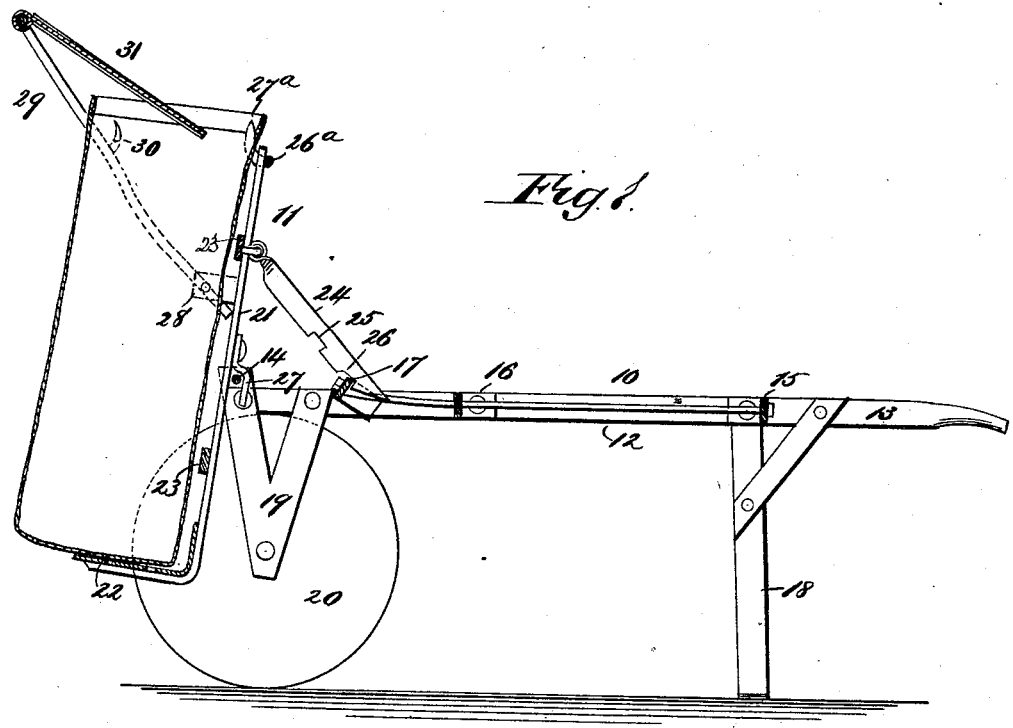
Figure 2:
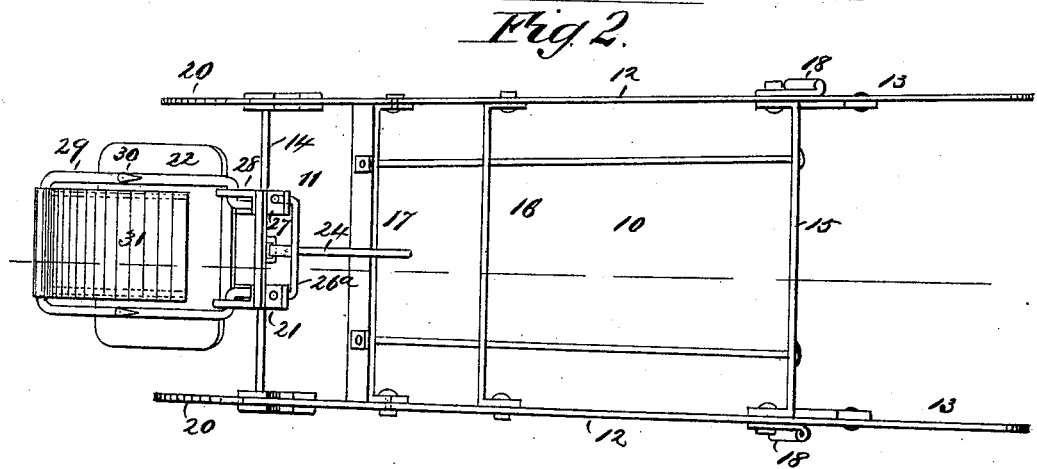

Figure 1 is a longitudinal vertical section through the complete device. Fig. 2 is a plan view, and Fig. 3 is a front elevation.

The invention consists, primarily, of a truck 10 and a bag-carrying frame 11, detachably attached to said frame. The body of the truck is constructed of two parallel side pieces 12, the rear ends of which constitute the handles 13, a forward transverse brace-rod 14, a rear transverse brace-bar 15, and an intermediate transverse brace-bar 16. The body of the said truck is further provided with a second intermediate brace-bar 17, attached transversely to the side pieces, which brace-bar 17 is inclined from the front in direction of the rear, as illustrated in Fig. 1, the same being purposed for use as a latch-bar. The truck 10 is completed by the addition to the body, near the handles, of downwardly-extending legs 18 and attached standards 19 at the forward end, in which standards supporting-wheels 20 are journaled.

Figure 3:
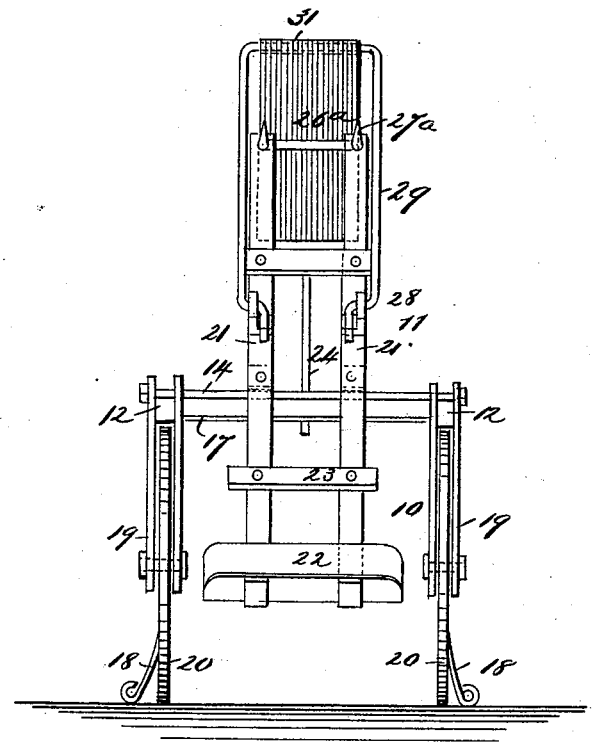

The bag-carrying frame is constructed of two parallel-spaced uprights 21, preferably of metal, the lower ends whereof are bent at right angles outward to form a rest or support for a rigidly-attached platform 22, as best shown in Figs. 1 and 3. At suitable distances between the platform and the upper ends of the uprights cross-bars 23 are secured, and upon the rear face of one upper cross-bar a latch 24 is hinged or pivoted, provided with two recesses 25 and 26. A straight wire rod 26ª is stretched transversely at the upper ends of the uprights, the ends of which rod are pointed and passed outward and upward through the standards to form the hooks 27ª, as illustrated in Figs. 1 and 3. About the center of the standards, upon each side, cleats 27 are attached, consisting of a downwardly-extending angled bar, as best shown in Fig. 1. Upon the forward face of the standards aligning ears 28 are secured near the top, in which ears an inverted-U-shaped arm 29 is pivoted, the said arm being adapted to project upward above the standards to swing outward at an angle thereto and parallel therewith. The outward movement of the arm is limited by the extremities being carried a slight distance downward and inward to engage the standards. The members of the U-shaped arm 29 are slightly curved outward and provided upon the rear side at or near the center with aligning hooks 30, and a shield 31 is pivoted or hinged to the body or horizontal portion of the arm, as best illustrated in Fig. 3, which shield is adapted to hang downward between the arm and the standards.

In operation the bag-carrying frame 11 is attached to the truck 10, by causing the cleats 27 to engage with the front bar 14 of the truck, as shown in Fig. 1, and the lower recess 26 to engage with the latch-bar 17. The bag is placed upon the platform 22 and attached at the top, respectively, to the hooks 27ª and 30, and the free end of the shield is extended a slight distance in the bag. The articles may now be thrown rapidly in the bag from the front, the shield serving as a guide, and the bag may also be readily transported from place to place. When the bag is full, the upper notch or recess 25 of the latch is engaged with the latch-bar 17, imparting to the bag-carrying frame a rearward inclination, whereby the said bag may be transported without spilling the contents.

Having thus described my invention, I claim as new and desire to secure by Letters Patent—

1. The combination, with the truck, of a bag-holder having vertically-extending uprights or arms connected between their ends to the front end of the truck-body and extending at their lower ends below said body, substantially as set forth.

2. The combination, with the truck, of a bag-holder connected between its ends to the front end of the truck-body to rock vertically above and below the same, and having a forwardly-projecting platform at its lower end to support the bag and devices at its upper end to engage the mouth of the bag, substantially as set forth.

3. The combination, with the truck having a cross-rod on the front end of its body, of a bag-holder having suspension hooks or cleats on its rear side between its ends engaging said rod, substantially as set forth.

4. The combination, with the truck, of the vertically-rocking bag-holder pivotally suspended between its ends on the front end thereof, and an adjustable latch connecting the holder and truck beyond their point of connection, substantially as set forth.

5. The combination, with a bag-holder, of arms pivotally connected thereto and having an inwardly-extending shield connected therewith, for the purpose set forth.

6. The combination, with the spaced uprights having hooks at their upper ends, of the ∩-shaped arm 29, pivoted near its ends to the standards and extending outward and upward above the standards, and the shield 31, pivotally connected with the cross-piece of said arm 29, and extending inwardly toward the uprights, substantially as set forth.

7. The combination, with a truck provided with a rearwardly-inclined cross-bar, of a frame detachably attached to the front of said truck, a platform secured to the lower end of the frame and upon the upper end of the same, a latch engaging the cross-bar, an essentially U-shaped arm pivoted to the frame, hooks secured to said U-bar, and a shield hinged to the same, all combined to operate substantially as shown and described.

8. The combination, with a truck provided with a rearwardly-inclined cross-bar, of a frame provided with cleats detachably attached to the truck, a platform at right angles to the frame, hooks secured to the upper end of the frame, and a latch pivoted to the rear of said frame provided with spaced recesses, an essentially U-shaped arm pivoted to the front face of the frame, teeth secured to the members of said arm, and a shield hinged to the body of the same, substantially as shown and described.

THOMAS B. JONES.

Witnesses:
W. P. VAUGHAN,
HENRY G. SHELDON.